April 7, 1953 J. C. HAWKINS 2,633,705
SEGMENTALLY SEPARABLE GAS TURBINE POWER PLANT
Filed March 30, 1946 4 Sheets-Sheet 1

INVENTOR
JOHN C. HAWKINS
BY
James B. Tucker
ATTORNEY

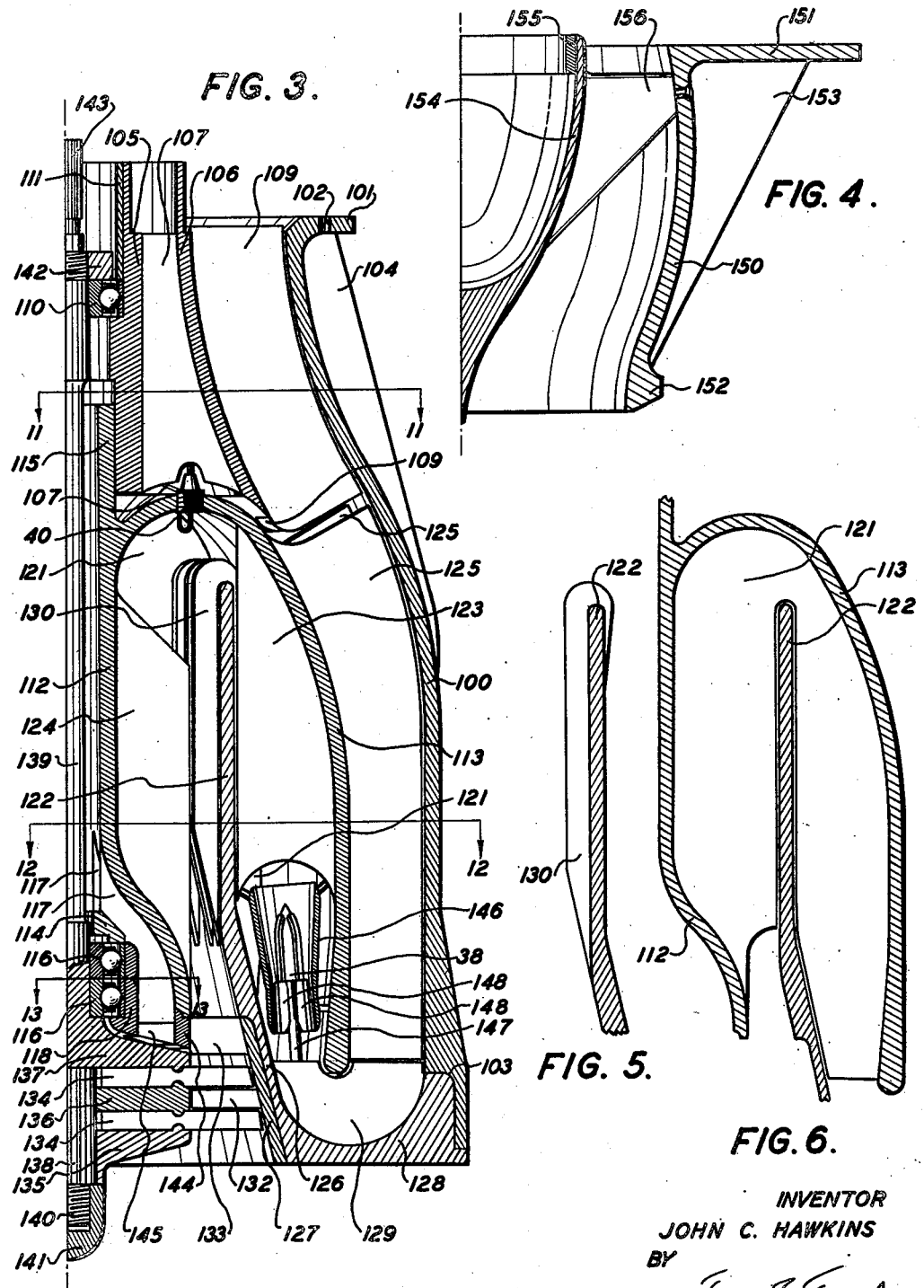

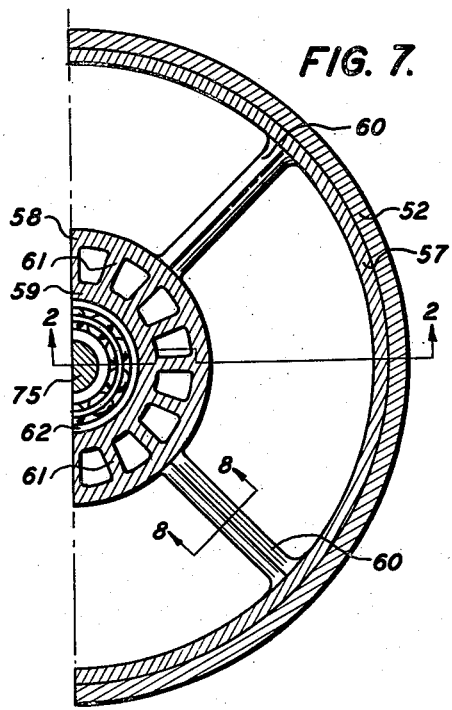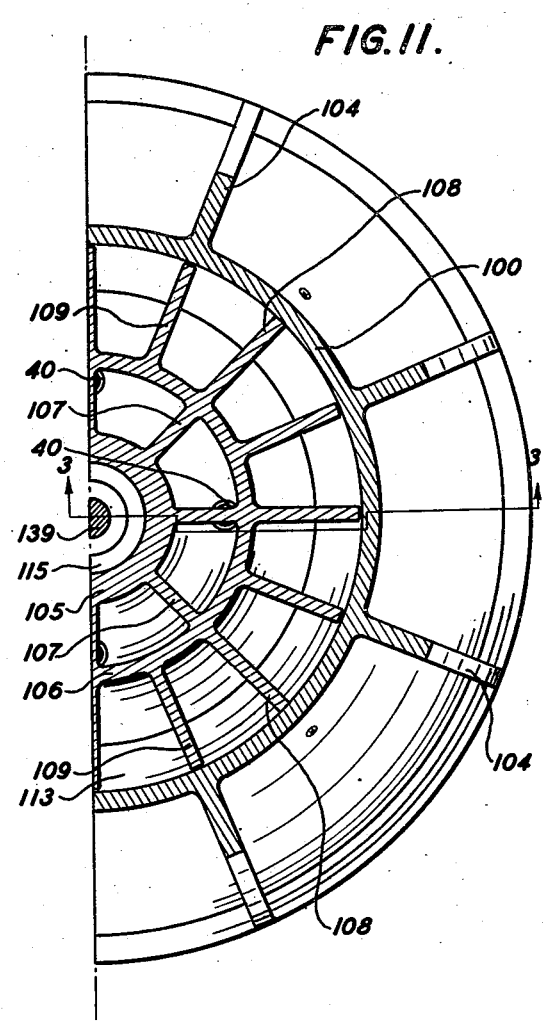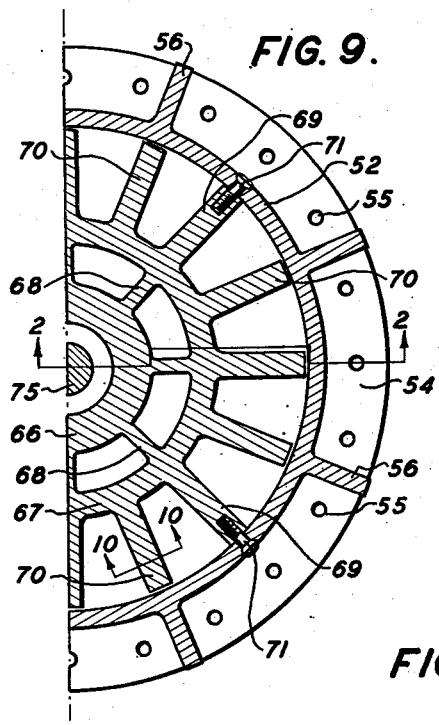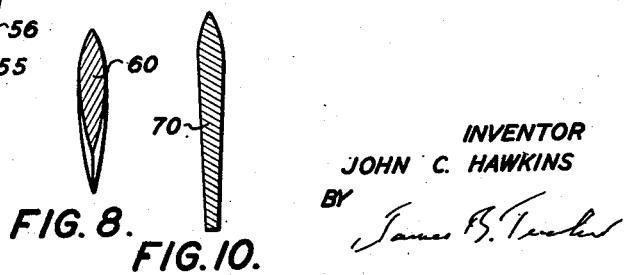

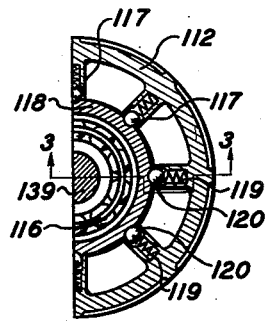
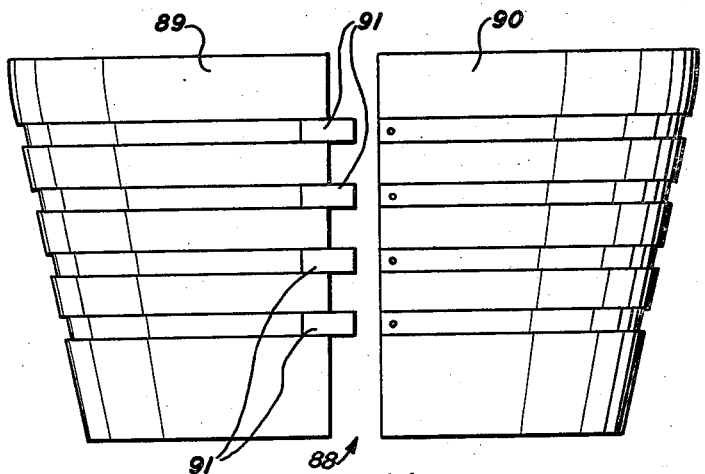
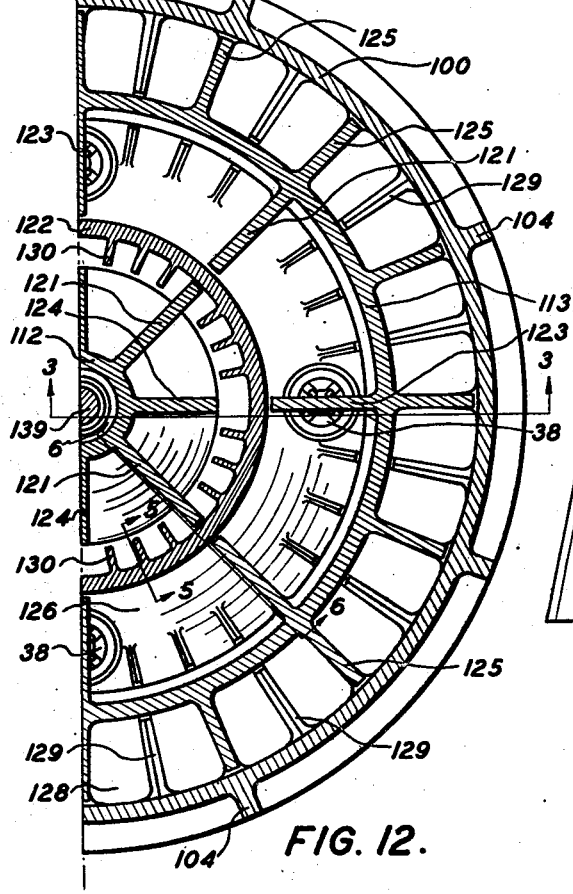
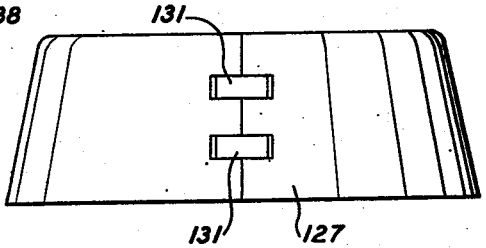
INVENTOR
JOHN C. HAWKINS
ATTORNEY

Patented Apr. 7, 1953

2,633,705

UNITED STATES PATENT OFFICE 2,633,705

SEGMENTALLY SEPARABLE GAS TURBINE POWER PLANT

John C. Hawkins, North Hollywood, Calif., assignor to John Hawkins and Associates Research Laboratory, Inc., North Hollywood, Calif., a corporation of California Application March 30, 1946, Serial No. 658,390

2 Claims. (Cl. 60—39.36)

My invention relates to continuous combustion motors of the type in which the expanding combustion products actuate a gas turbine, which in turn drives a compressor for supplying air to the motor and maintaining the necessary pressure gradient.

The particular embodiment of my invention herein described is a pure jet-propulsion motor, that is, one in which the gas turbine develops only sufficient power to drive the compressor, the remainder of the energy of the expanding combustion products being utilized in a jet for propelling an aeroplane.

An object of my invention is to provide a motor which is easy to assemble and to disassemble, and which may be handled in separable segments for transportation and installation.

Further objects and advantages of my invention will be evident from the following description and from the drawings, in which:

Fig. 3 is a longitudinal section of one of two identical halves of the gas-turbine segment, taken on the lines 3—3 of Figs. 11, 12, and 13;

Fig. 4 is a longitudinal section of one of two identical halves of the turbine discharge chamber segments;

Fig. 5 is a fragmentary longitudinal section on the line 5—5 of Fig. 12;

Fig. 6 is a fragmentary longitudinal section on the line 6—6 of Fig. 12;

Fig. 7 is a cross section on the line 7—7 of Fig. 2;

Fig. 8 is a fragmentary longitudinal section on the line 8—8 of Fig. 7;

Fig. 9 is a cross section on the line 9—9 of Fig. 2;

Fig. 10 is a fragmentary longitudinal section on the line 10—10 of Fig. 9;

Fig. 11 is a cross section on the line 11—11 of Fig. 3;

Fig. 12 is a cross section on the line 12—12 of Fig. 3;

Fig. 13 is a fragmentary cross section on the line 13—13 of Fig. 3;

Fig. 14 is a plan view of the compressor stator blade sleeve, the two parts being shown disassembled; and Fig. 15 is a plan view of the turbine stator blade sleeve, the two parts being shown assembled.

Figures 1, 2:
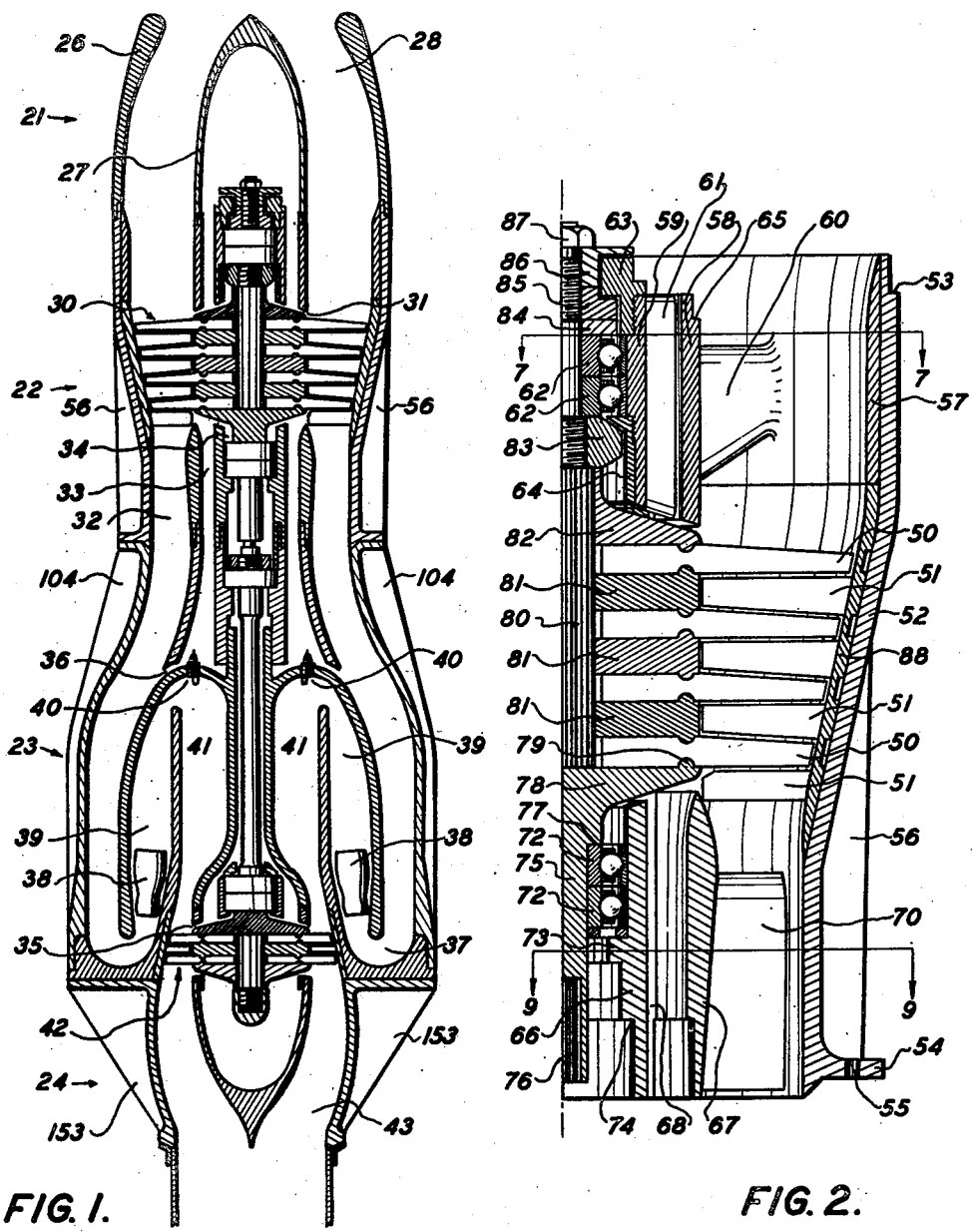
Fig. 1 is a somewhat diagrammatic longitudinal section of the whole motor assembled, all background being omitted.
Fig. 2 is a longitudinal section of one of two identical halves of the compressor segment, taken on the lines 2—2 of Figs. 7 and 9.

In Fig. 1 many features, including all of the background structure, are omitted, this figure being intended primarily to show the relation of the various sub-assemblies to one another and to clarify the manner in which the motor functions. In Fig. 1, and also in the other longitudinal sections and the plan views, the direction of motion of the motor is toward the upper end of the page.

Referring now to Fig. 1, it will be noted that the motor is divided, approximately along transverse planes, into five segments, each of which (with one unimportant exception) can be assembled independently of the others. These are, from front to rear, the air inlet segment generally indicated at 21, the compressor segment generally indicated at 22, the gas turbine segment generally indicated at 23, the turbine discharge chamber segment generally indicated at 24, and nozzle tube 25.

Air inlet segment 21 consists of duct 26 and diffuser cap 27, which form the outer and inner walls respectively of an annular air passage 28. The air inlet segment is subject to extreme variation depending on the type of installation; in the case of a motor mounted in the wing of an aeroplane the form illustrated would be used, but in the case of installation in the fuselage a quite different system of scoops and ducts would be required.

Segments 22, 23, and 24 are shown in more detail in other figures and will be fully described hereinafter. Nozzle tube 25 is regularly cylindrical except for a moderate restriction near the rear end forming a Venturi throat 29, for imparting a final increase in velocity to the combustion products before discharge to the atmosphere. The nozzle tube is of sufficient length (such as eight feet) to permit the expansion of the combustion products to be substantially complete before discharge.

Briefly described, the manner of operation of this motor is as follows. A main stream of air flows rearwardly through passage 28 to axial-flow turbo-compressor 30. A secondary stream of air for cooling purposes flows through and around the forward bearing structure through channels which will be described below. This secondary stream of air joins the main stream by way of annular vent 31, immediately in front of compressor 30. The compressor raises the air mass to a high pressure and delivers a main stream to passage 32, an outer secondary stream to passage 33, and an inner secondary stream to passage 34 immediately surrounding the shaft. The main stream and the outer secondary stream are subdivided into longitudinal channels by fins, webs, and spider legs to be described below.

The inner secondary stream flows rearwardly through the bearings (which are ball bearings of open construction) and around the shaft all the way back to annular vent 35 immediately in front of the gas turbine, and the outer secondary stream rejoins the main stream through annular vent 36. Both secondary streams serve as cooling media for the bearings, the shaft, and associated parts. The main stream of air flows on rearwardly to 37, where a first reversal of flow occurs. Thence the air flows forwardly past fuel injectors 38—38 into mixing chambers 39—39 where the stream is converted into a mixture of air and kerosene or the like. At the end of the mixing chambers a second reversal of flow occurs and the stream flows past igniter plugs 40—40 into combustion chambers 41—41. It will be noted that, by means of the two reversals of flow and the system of fins and webs which will be described hereinafter, an efficient two-stage heat-exchange relation is produced which preheats the stream of air to a high degree and conserves a great deal of thermal energy which would otherwise be lost. The reversals of flow do somewhat impede the stream and thus increase the load on the compressor, but this loss of energy is much more than compensated for by the increase of thermal efficiency achieved by the preheating of the air.

From combustion chambers 41—41, the burning and rapidly expanding stream flows rearwardly through axial-flow gas turbine 42, which converts a portion of the energy of the expanding gases into rotative motion, and which drives the rotor of compressor 30 by means of a shaft which will be described below.

After leaving the turbine, the burning stream passes through discharge chamber 43 into nozzle tube 25, wherein substantially complete expansion of the combustion products occurs. Thus, when the stream is discharged to atmosphere at the rearward end of the tube 25, it is a jet of fairly low pressure and extremely high velocity, very suitable as propulsion means for aircraft.

Consider now Figs. 2, 7, and 9, which show in greater detail the assembled compressor segment 22. The compressor rotor blades 50—50 and the compressor stator blades 51—51 are shown only in outline, since blade design does not form part of my present invention and since the theory of design of axial-flow turbo-compressor blades is known to those skilled in the art of producing jet-propulsion motors and the like. However, my invention does include certain novel means for mounting the compressor blades.

The outer casing 52 of the compressor segment is of annular, one-piece construction, consisting of a forward cylindrical portion, a rear cylindrical portion of smaller diameter, and a rearwardly converging conical portion joining the two cylindrical portions. The front end of casing 52 is provided with a shoulder 53 to receive a matching shoulder on the rear end of air inlet duct 26, and the rear end of casing 52 is provided with a flange 54 having a number of bolt holes 55—55 for attachment to the casing of the gas-turbine segment. Formed integrally with casing 52 are eight longitudinal ribs 56—56, which run along the outside of the casing from the front end of the conical portion to flange 54, as is more clearly shown in Fig. 1.

The forward spider is an integrally formed part consisting of outer, intermediate, and inner cylindrical portions 57, 58, and 59 respectively, four spider legs which join outer cylindrical portion 57 to intermediate cylindrical portion 58, and sixteen webs 61—61 which join inner cylindrical portion 59 to intermediate cylindrical portion 58. Spider legs 60—60 are streamlined as shown in Fig. 8, and the leading and trailing edges of webs 61—61 are also streamlined. The inside of inner cylindrical portion 59 is bored to a proper diameter to receive a pair of bearings 62—62 and is also bored and threaded to receive bearing locking rings 63 and 64. The front end of intermediate cylindrical portion 58 is provided with a shoulder to receive a matching shoulder on the rear end of diffuser cap 27.

The compressor segment rear spider is an integrally formed part consisting of inner cylinder 66 and outer cylinder 67 joined by eight webs 68—68, and sixteen longitudinal members projecting from the outer surface of outer cylinder 67, four of which are spider legs 69—69 while the remaining twelve are fins 70—70. Spider legs 69—69 differ from fins 70—70 only in that the spider legs are long enough radially to be in contact with the inner surface of casing 52 and each is provided with two threaded holes to receive high strength bolts as indicated at 71—71 in Fig. 9, while fins 70—70 are slightly shorter, to provide clearance between their outer ends and the casing, and are not provided with bolt holes. The clearance permits the casing to respond to unequal thermal expansion by a slight distortion in the shape of its cross section and thus prevents excessive strain on the parts and prevents other types of distortion which would be less desirable.

The forward edges of the fins, webs, and spider legs, together with the forward edge of cylinder 67, are streamlined, while the rear edges of these members, which abut against similar members in the gas-turbine segment, are left square or provided with shoulders as shown. A longitudinal section of a fin 70 is shown in Fig. 10; a similar section of a spider leg 69 would be identical. It will be seen that these fins and spider legs are thickened in their forward portions. This thickening cooperates with a similar thickening of cylinder 67 to produce a restriction of passage 32 immediately to the rear of the turbo-compressor. The restriction is desirable for increasing the velocity of the main stream at this point.

The inner surface of inner cylinder 66 is bored to fit a pair of bearings 72—72, an inwardly projecting bearing-retaining ring 73 being left. Also, the rear end of cylinder 66 is provided with a shoulder 74 to receive parts of the gas-turbine segment.

Compressor shaft 75, which is an integrally formed unit, is provided internally at its rear end with splineways as shown at 76, for the purpose of operatively connecting it with the gas-turbine shaft. Somewhat forward of this, the shaft is provided with a shoulder 77 which fits against bearing 72 and with a wide outwardly projecting disc 78 which forms the rear disc of the compressor rotor. The forward face of disc 78 is perpendicular to the axis and flat except for an annular rib 79 near the periphery.

Forward of disc 78 the shaft has a splined portion 80 upon which fit three intermediate discs 81—81 and forward disc 82, these four discs being provided with central openings having suitable splineways. Both faces of each of intermediate discs 81—81 are provided with annular ribs like rib 79, and the rear face of forward disc 82 is also provided with such a rib. The base portions of rotor blades 50—50 are provided with arcuate channels which fit the annular ribs of discs 78, 81—81, and 82.

Forward of splined portion 80, shaft 75 has a threaded portion to receive nut 83, a smooth portion to receive bearings 62—62 and spacer 84, and another threaded portion to receive lock nuts 85 and 86. The forward end of the rotating structure is shown as being finished off with a hexagon nut 87, but it will be understood that in practice the forward end of the structure is modified to provide suitable connecting means for a starting motor or for a train of reduction gears.

Stator blades 51—51 project inwardly from compressor stator blade sleeve 88, to which they are attached by welding. As shown in Fig. 14, sleeve 88 is split longitudinally into two halves 89 and 90, which, when assembled, are connected together by a number of tabs 91—91. These tabs are merely to facilitate assembly; they do not bear any stress when the motor is assembled and operating.

The rotor blades may be secured against angular motion with respect to the shaft in various ways, but I prefer to use a light resistance weld which is strong enough to prevent angular slippage but which can be broken loose easily when it is desired to disassemble the rotor to replace blades or other parts.

The clearance between bearing-retaining rings 63 and 64 and the adjacent parts of the shaft assembly is made somewhat greater than that necessary for avoiding contact, in order to provide an adequate passage for a stream of air which flows through bearings 62—62. After cooling the bearings, this stream of air flows rearwardly to the forward face of disc 82, then outwardly to join the main stream immediately in front of the first row of rotor blades. Other streams of cooling air flow through the sixteen longitudinal channels between webs 61—61, and join the main stream in the same way. Thus the bearings are cooled both directly and indirectly through extensive heat-transfer surfaces. Bearings 72—72 are cooled similarly by air which flows from the compressor inwardly over the rear face of disc 78 into the annular passage surrounding the rear portion of shaft 75 and into the eight longitudinal channels between webs 68—68.

Rearwardly of the compressor the main stream is divided into sixteen equal parts by fins 70—70 and spider legs 69—69. The additional heat-transfer surface thus achieved is of minor importance at this point, although it is of major importance in similar portions of the gas-turbine segment. But this subdivision of the main stream is highly desirable for beginning the directional flow control of the air mass and for equalizing the flow of air to the eight mixing chambers which will be described below.

Consider now Figs. 3, 11, and 12, which show in detail the assembled gas-turbine segment 23. Casing 100 is of annular, one-piece construction. Its forward end, which is of the same diameter as the rear end of casing 52, is provided with a flange 101 and bolt holes as illustrated at 102, to match flange 54 and bolt holes 55—55. From the front end the casing diverges rearwardly on a smooth curve for about half its length. The rear half of the casing is cylindrical except that near the rear end the outer surface diverges to create a thickened portion of the wall and the inner surface is cut away at the rear end to form a shoulder 103. Eight ribs 104—104 project outwardly from the casing wall. These begin at flange 101 and terminate in the rearward thickened portion of the casing wall as is illustrated more clearly in Fig. 1.

The turbine-segment forward spider is a one-piece unit consisting of inner cylindrical member 105, an outer, rearwardly flaring member 106, eight webs 107—107 joining members 105 and 106 to one another, and four spider legs 108 and twelve fins 109 projecting outwardly from member 106. As in the rear compressor-segment spider, the spider legs differ from the fins only in that the former extend out far enough to be in contact with the casing and are provided with bolt holes while the latter have no bolt holes and terminate a little short of the casing wall, leaving enough clearance to permit differential thermal expansion. The forward ends of members 105 and 106 are provided with shoulders to match the corresponding shoulders of the rear compressor-segment spider, in order that these parts fit together as shown in Fig. 1. The forward portion of inner spider member 105 is bored to a proper diameter to receive bearing 110 and bearing-retaining sleeve 111, and the rear portion of member 105 is bored to a proper diameter to receive the forward hub end of the master-chamber unit about to be described.

The master-chamber unit is an integrally formed piece consisting of an elongated hub 112, a wall 113, a bearing-engaging ring 114, and various fins and webs to be set forth. The rear portion of wall 113 is cylindrical, somewhat thickened toward the end, and the end is rounded off as shown. The forward portion of wall 113 converges forwardly on a smooth curve until it meets a portion of the wall which is formed to the arc of a torus, recurving to meet hub 112 with the inner surface of the wall tangent to the outer surface of the hub. The toroidal portion of the wall constitutes the front wall of the combustion chambers and the means for causing the second reversal of flow of the air stream.

Hub 112, which is cylindrical throughout most of its length, extends forward of its junction with wall 113 a short distance to form projection 115, which fits within the rear portion of member 105. The rear end of hub 112 is enlarged on an ogee curve to form a housing and cooling region for bearings 116—116. The enlarged portion of the hub is joined to ring 114 by eight webs 117—117; these webs have rearward extensions which constitute the mounting for bearing-locking ring 118 and which are provided with holes to contain springs 119—119 and balls 120—120, as shown in Fig. 13.

Four webs 121—121 subdivide the space between hub 112 and wall 113. The shape of these webs is shown most clearly in Fig. 6; in particular, it should be noted that each is provided with a deep cut of the proper size and shape to receive cylinder 122 and leave a moderate clearance. Four fins 123—123, situated alternately with respect to webs 121—121, extend inwardly from wall 113 as far as cylinder 122, a moderate clearance being left. The rear ends of fins 123—123 are cut away to provide housing space for fuel injectors 38—38. Four ribs 124—124, situated alternately with respect to webs 121—121, project outwardly from hub 112. These ribs are low enough to fall well short of cylinder 122.

Sixteen fins 125—125 extend outwardly from wall 113. In the assembled motor these fins are longitudinally continuous, except for a liberal clearance left for expansion, with the four spider legs 108—108 and the twelve fins 109—109 of the forward turbine-segment spider. However, all of the fins 125—125 are of a proper size and shape to leave clearance between their outer edges and casing 100 and none of them is provided with fastening means, other means for securing the master-chamber unit having been provided.

The combustion-chamber throat unit is an integrally formed piece consisting of a cylindrical portion 122, a rearwardly diverging conical portion 126 of somewhat greater wall thickness except where it is cut away to receive turbine stator blade sleeve 127, a deep bulkhead 128, and the ribs and vanes which will be described. The rear face of bulkhead 128 is plane and perpendicular to the axis of the motor, the outer surface is shaped to fit the rear end of casing 100, and the forward face is formed to the arc of a torus in order to cause the first reversal of the air stream. Thirty-two approximately semicircular vanes 129—129 extend forward from the forward face of bulkhead 128; in each of these is left a semicircular notch to make room for the rear end of wall 113. Cylindrical portion 122 is provided with twenty-four ribs 130—130, arranged in groups of three and distributed as shown in Fig. 12, which act as flame grids and which serve to stiffen the cylinder and thus minimize thermal distortion. The shape of these ribs is shown more clearly in Fig. 5.

Axial-flow gas turbine 42 is generally similar to the turbo-compressor, except that the structure is much smaller and the blade design is entirely different. As in the case of the compressor, the blade design is not shown since it falls outside the scope of the present invention and since those skilled in the art of producing jet-propulsion motors understand the principles of designing blades for axial-flow gas turbines.

Turbine stator blade sleeve 127, like compressor stator blade sleeve 88, is made in two halves which are attached to one another by tabs 131—131 as shown in Fig. 15. Inwardly projecting from sleeve 127 are a single series of stator blades 132 and the blades of nozzle ring 133. The primary function of the nozzle ring is to increase the velocity of the gas stream immediately upstream of the turbine and to control the manner in which the gas impinges upon the first row of rotor blades, and its design is intimately connected with the design of the turbine blades. In my motor the nozzle ring also serves a structural purpose, being the means for holding bearing-locking ring 118 in position.

The gas-turbine rotor includes two rows of rotor blades 134—134 held in position by rear disc 135, intermediate disc 136, and forward disc 137. These discs are substantially the same, in design and function, as the discs of the compressor rotor described above. Rear disc 135 and intermediate disc 136 are provided with central openings and splineways which match splined portion 138 of shaft 139, while forward disc 137 is an integral part of shaft 139.

Gas-turbine shaft 139 terminates at the rear of splined portion 138 in a threaded portion 140 which receives lock nut 141. Forward of disc 137 the shaft has a smooth portion of the proper diameter to receive bearings 116—116, then an elongated portion of slightly smaller diameter, then another bearing-receiving portion to fit bearing 110, a threaded portion to receive nut 142, and finally a splined portion 143 to match the internal splineways 76 at the rear end of the compressor shaft.

The gas-turbine bearing lock consists of an inner ring 118, an outer ring 144, and eight webs 145 which join the rear end of ring 118 to ring 144. Inner ring 118 is a short cylindrical member the inner surface of which fits the periphery of bearings 116—116, with an inwardly extending projection at the rear end. The outer surface of the forward and medial portion of ring 118 fits the rearward extensions of webs 117—117 and is provided with depressions to receive spring-urged balls 120—120 shown in Fig. 13. Outer ring 144 is shaped to fit the enlarged rear end of master-chamber hub 112 and is provided with threaded holes by means of which it is bolted, through blades of nozzle ring 133, to sleeve 127.

The four fuel injectors 38—38 are mounted immediately behind and in line with the four fins 123—123, so that each fuel injector serves two of the eight mixing chambers partitioned off by fins 123—123 and webs 121—121. Various types of fuel injectors which have been devised for continuous combustion motors are suitable for use. The design of the fuel injectors does not form part of the present invention except to the extent it is modified to facilitate assembly of the motor. It will be noted that the shield 146 of an injector is fixed to the rear end of a fin 123 and to master-chamber wall 113, while the fuel injector proper is connected by means of fuel tube 147 to one of the vanes 129. The rear end of the injector proper is provided with four spider legs 148—148 which fit into the slightly flaring rearward portion of the shield. When, during assembly of the motor, the master-chamber unit and the combustion-chamber throat unit are fitted together, each of the fuel injectors slips into place within its shield and is thenceforth held firmly and accurately in position without the need of other fastening means.

Four combustion chambers are partitioned off between hub 112, throat 122, and the toroidal front portion of wall 113 by the four webs 121—121. Each combustion chamber is provided with one of the four igniter plugs 40—40. These plugs are similar in construction to the familiar spark plug used in gasoline engines, a loop of resistance wire being substituted for the spark gap. They are screwed into suitable threaded openings in the front wall of the combustion chambers.

It will be noted that the various air channels partitioned off in the rear portion of the compressor segment are continued in the gas-turbine segment. The inner secondary stream flows through bearing 110 and through the annular space surrounding shaft 139, cooling these parts as it goes, until it reaches the housing region of bearings 116—116. There it is divided into an inner stream and an outer stream, the latter being subdivided into eight channels by webs 117—117. The inner stream flows through bearings 116—116 to produce direct cooling, and thence outwardly over the forward face of disc 137 until it is drawn into the main stream of gas just forward of the gas turbine. The outer stream flows through the channels between webs 117—117 to produce indirect cooling of the bearings and then joins the main gas stream in the same manner. The outer secondary stream issuing from the compressor segment flows between members 105 and 106 of the forward turbine-segment spider, the subdivision into eight channels being continued by webs 107—107. This stream is drawn into the main air stream through the annular vent at the rearward end of member 106.

The subdivision of the main stream into sixteen parts is continued in the gas-turbine segment by fins 109—109 and spider legs 108—108 of the forward spider, and then by fins 125—125 of the master-chamber unit. The sixteen channels are then temporarily subdivided into thirty-two channels by vanes 129—129, in order to achieve better directional flow control in the region of the first reversal of the air stream. Then the thirty-two parts of the stream are combined into eight parts in the mixing chambers and next are further combined into four parts in the combustions. Finally, at the rearward termination of the inner portions of webs 121—121, the main stream is combined into a single annular channel prior to its entry to nozzle ring 133.

Consider now Fig. 4, which illustrates turbine discharge chamber segment 24. Casing 150, at its front end, has the same inside diameter as the rear end of sleeve 127 which it abuts in the assembled motor. Rearwardly the casing wall first diverges to produce a streamlined surface in combination with the conical inner surface of sleeve 127 and then, following a smooth curve, converges to bring the diameter down to match that of nozzle tube 25. At its front end casing 150 is provided with a wide flange 151 which matches the flat rear surface of bulkhead 128, and at its rear end there is an outwardly projecting annular rib 152 which serves as a stiffening element and as attachment means for nozzle tube 25. Extending outwardly from casing 150 are eight longitudinal ribs 153—153 which run from flange 151 to annular rib 152, as shown more clearly in Fig. 1.

Fitting within casing 150 is turbine discharge diffuser cap 154. At its front end the outer diameter of the cap is the same as the outer diameter of the turbine rotor hub, and rearwardly the walls of the cap converge to a sharp point along an approved streamline curve as indicated. The front end of the cap is stiffened by a ring 155 welded into place, and four spider legs, one of which is illustrated at 156, are provided for fastening cap 154 in place within casing 150.

The method of assembling the discharge chamber segment is obvious, although it should be noted that the height of spider legs 156 makes it necessary to turn the diffuser cap at an angle for insertion within casing 150.

Each of the various segments of the motor being assembled, the segments are then joined as indicated in Fig. 1 and bolted together. This final assembly is ordinarily performed in the place of installation, such as the wing of an aeroplane, one of the advantages of my invention being that installation is greatly facilitated by the possibility of handling the motor in separate segments. The splined connection between the compressor shaft and the gas turbine shaft is of value not only for making possible the final assembly but also for permitting axial motion of the two shafts relative to one another in response to thermal expansion.

A number of features which are either minor or auxiliary have been omitted from the drawings in order to avoid unnecessary crowding and complexity of the figures. For example, numerous high-strength bolts and screws are used to attach members to one another and only a few of these have been illustrated.

The electrical leads for igniter plugs 40—40, which are conductors covered by heat-resistant insulation, are run through passages formed in webs 107—107 and spider legs 108—108 and through casing 100 to the outside of the motor, where they are connected to a source of low-voltage current. Similarly, the electrical lead for the starting motor housed in cap 27 is run through one of the spider legs 60—60.

I claim as my invention:

1. A continuous-combustion motor comprising: a compressor-segment casing of annular cross section; a gas-turbine-segment casing of annular cross section, adapted for end-to-end connection to said compressor-segment casing; a compressor shaft bearing a compressor rotor and a gas-turbine shaft bearing a turbine rotor, said shafts being adapted for end-to-end connection by longitudinal splines and matching splineways; a longitudinally split stator-blade sleeve adapted for assembly around said compressor rotor and adapted to fit within said compressor-segment casing; a pair of bearing housings for said compressor shaft, affixed to said compressor-segment casing; a longitudinally split stator-blade sleeve adapted for assembly around said turbine rotor; an integrally formed annular wall adapted to receive internally said turbine stator-blade sleeve; a pair of bearings for said turbine shaft, affixed to said turbine-segment casing; and means for affixing said annular wall to said turbine-segment casing.

2. In a continuous-combustion motor having a combustion chamber, a compressor for supplying air to said combustion chamber, and a gas turbine for driving said compressor, the subcombination comprising: a casing segment of annular cross section for said compressor; a casing segment of annular cross section for said gas turbine and said combustion chamber; a shaft for said compressor; a shaft for said turbine; means affixed to said compressor casing and independent of said turbine casing for axially mounting said compressor shaft; and means affixed to said turbine casing and independent of said compressor casing for axially mounting said turbine shaft; said casing segments being adapted for end-to-end connection to one another and said shafts being adapted for end-to-end connection with one another by longitudinal splines and matching splineways.

JOHN C. HAWKINS.

REFERENCES CITED

The following references are of record in the file of this patent:

UNITED STATES PATENTS

| Number | Name | Date |
| --- | --- | --- |
| 635,919 | Curtis | Oct. 31, 1899 |
| 768,919 | Torrens | Aug. 30, 1904 |
| 803,362 | Rice | Oct. 31, 1905 |
| 824,521 | Ahlquist | June 26, 1906 |
| 1,331,766 | Hemingway | Feb. 24, 1920 |
| 1,730,746 | Röder | Oct. 8, 1929 |
| 2,080,425 | Lysholm | May 18, 1937 |
| 2,085,761 | Lysholm | July 6, 1937 |
| 2,151,699 | Heiner | Mar. 28, 1939 |
| 2,256,198 | Hahn | Sept. 16, 1941 |
| 2,303,190 | Anderson | Nov. 24, 1942 |
| 2,326,072 | Seippel | Aug. 8, 1943 |
| 2,405,164 | Pavlecka | Aug. 6, 1946 |
| 2,405,415 | Eksergian | Aug. 6, 1946 |
| 2,410,769 | Baumann | Nov. 5, 1946 |
| 2,461,931 | Smith et al. | Feb. 15, 1949 |
| 2,469,439 | Lundquist | May 10, 1949 |
| 2,476,218 | Prime | July 12, 1949 |
| 2,477,683 | Birmann | Aug. 2, 1949 |

FOREIGN PATENTS

| Number | Country | Date |
| --- | --- | --- |
| 212,654 | Germany | Aug. 6, 1909 |